United States Patent Office 2,905,209
Patented Sept. 22, 1959

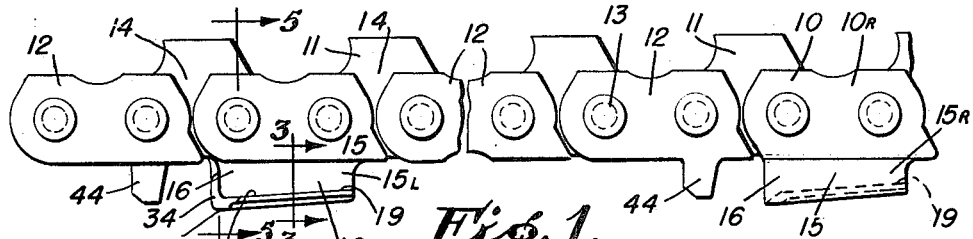

2,905,209

HIGH SPEED SAW CHAIN

Austin Gudmundsen, Inglewood, Calif., assignor to McCulloch Motors Corporation, Los Angeles, Calif., a corporation of Wisconsin Application December 26, 1956, Serial No. 630,695

8 Claims. (Cl. 143—135)

This invention relates in general to saw chains and relates in particular to an improvement in saw chains adapted to be operated at high speeds such as 2,000 feet per minute and above. The chain is especially adapted for use on chain saw devices wherein the chain is driven by a sprocket mounted directly upon the engine shaft, and therefore at high speed, instead of being driven by a slow speed sprocket which is connected to the engine shaft through a reduction gear set. The improved saw chain disclosed herein cuts much faster than other chains employed upon the same saw devices as employed for the operation of the chains made in accordance with the present invention, the improvement in cutting speed being in the range of, and in some instances greater than, 20%.

It is an object of the invention to provide a saw chain of simple form in that it employs a single type of cutter employed in allochiral relation and spaced along the chain. The allochiral cutters are characterized by an ability to remove chips or shavings from the bottom of the kerf being cut with greater effectiveness, the result being that the chain has a cutting rate materially greater than that of the chains previously employed upon the same chain saw devices as that employed for the operation of the invention.

It is an object of the invention to provide a saw chain having spaced thereon in allochiral relation cutters each having a main cutting edge for severing one side of a shaving from the bottom of the kerf being cut, and lifting such shaving, the cutter having secondary cutter means for severing the remaining edge of the shaving, along a longitudinal line lying close to the median plane of the saw chain.

It is a further object of the invention to provide a cutter of the character described in the preceding paragraph having a transverse portion sharpened at its forward end to provide a cutting edge, the inner edge of the transverse portion having therealong an external step or channel so that when the front end of the transverse portion is sharpened the cutting edge will be stepped or notched so as to provide a secondary cutting means for severing the attached edge of the shaving lifted by the main cutting edge of the cutter.

It is a further object of the invention to provide a saw chain having spaced therealong in allochiral relation cutters each of which has a transverse cutting blade or portion of a width approximately half of the width of the kerf which is to be cut, there being secondary cutting means on the inner edge of the transverse plate for severing along a longitudinal line which approximately coincides with the median plane of the kerf and of the saw chain, the attached edge of the shaving lifted by the main cutting edge of the cutter. In the form of the invention disclosed herein the transverse cutting blade of the cutter is slightly wider than half the width of the kerf, thereby providing a blade portion which intersects the median plane of the chain and of the kerf to carry the secondary cutting means referred to in the foregoing.

It is also an object of the invention to provide a saw chain having spaced cutters in allochiral relation, these cutters having transverse cutting edges which extend diagonally inwardly and rearwardly from the margins of the bottom wall of the kerf being cut, the main portions of these cutting edges being adapted to sever one edge of a shaving along a margin of the kerf and lift the shaving, and said cutting edges having at their inner ends portions which slope or are offset upwardly so as to sever the attached edges of the shavings along longitudinal lines substantially coinciding with the median plane of the kerf.

Further objects and advantages of the invention may be brought out in the following part of the specification wherein small details have been described for the purpose of providing a complete competent disclosure without intending, however, to thereby limit the scope of the invention which is defined in the appended claims.

Referring to the accompanying drawings which are for illustrative purposes only:

Fig. 1 is a side view of a portion of a saw chain according to the present invention;

Fig. 2 is a bottom plan view of the chain shown in Fig. 1;

Fig. 3 is an enlarged fragmentary section taken as indicated by the line 3—3 of Fig. 1;

Fig. 4 is a sectional view taken as indicated by the line 4—4 of Fig. 3;

Fig. 5 is a sectional view taken as indicated by the line 5—5 of Fig. 1 showing the chain, cutter and the manner in which the cutter removes the shaving from the bottom of the kerf;

Fig. 6 is a fragmentary view similar to Fig. 3 showing an alternative form of cutter;

Fig. 7 is a sectional view taken as indicated by the line 7—7 in Fig. 6; and

Fig. 8 is a schematic view showing a condition encountered in the use of high speed saw chains and which is avoided by the use of the present invention.

The saw chain, embodying the present invention, shown in Fig. 1 has cutter links 10 and spacer links 11 and 12 connected in the customary manner by pivot means consisting of rivets 13. The spacer links 11 are shown as center links and the spacer links 12 are side links, the center links 11 having projections 14 adapted to ride in the groove of a saw bar.

The cutter links 10 are individually identified as 10L and 10R for the reason that they respectively carry righthand and lefthand cutters 15 separately identified by the numerals 15L and 15R. The cutter links 10 are disclosed as side links of the chain, but it will be recognized that they could be center links. The cutters 15 are allochiral and, therefore, they have the same parts, but arranged in righthand and lefthand relation. The detailed description of one cutter 15 is also a detailed description of the other cutter with exception that the other cutter is arranged in opposite hand relation to the described cutter. Referring to Figs. 3 and 5 the lefthand cutter 15L has a shank portion 16 which extends outwardly (downwardly) from the outer edge 17 of the cutter link 10L in spaced relation to the median plane a—a of the chain and of the kerf 18 which is cut by the chain. The cutter 15L has a transverse plate portion 19 the outer edge 20 of which is connected to the extremity 21 of the shank 16. The cutter link 10L and the cutter 15L are integrally formed from a single steel plate and the shank 16 and the transverse blade portion 19 are joined by a curve which includes the edges 20 and 21 of the transverse portion 19 and the shank 16.

The front end 22 of the cutter 15L is sharpened as shown at 23 in Figs. 3 and 4 so as to produce on the cutter a cutting edge 24 which starts at a point 25 on the shank 16 and which extends diagonally rearwardly from the outer edge 20 of the transverse portion 19 to a point contiguous to the median plane *a—a*. This cutting edge 24, referred to herein as the main cutting edge of the cutter, as shown in Fig. 5, is adapted to sever one edge 26 of a shaving or chip 27 and to lift the shaving 27 from the bottom of the kerf 18 somewhat in the manner shown in Fig. 5. The transverse portion 19 has at its inner end an auxiliary or secondary cutting means 29 for severing the attached portion 30 of the shaving 27 along a longitudinal line which is close to or coincides with the median plane *a—a*, the shaving 27 being then entirely separated from the bottom of the kerf 18 as indicated by dotted lines 27*a* in Fig. 5.

As shown in Figs. 3 and 4, the front edge of the transverse portion 19 has a notch 31 defined in part by the cutting means 29 which consists of a cutting edge disposed rearwardly of the main cutting edge 24 and also upwardly of the bottom cutting plane *c—c* of the cutting edge 24, as shown in Fig. 3, this plane *c—c*, in the preferred form of the invention, being perpendicular to the median plane *a—a* of the chain. Therefore, when the shaving 27 is lifted as shown in full lines at Fig. 5 the unsevered edge 30 thereof is raised into the path of movement of the cutting edge 29 so that the cutting edge 29, as it moves forwardly in its position spaced rearwardly and upwardly from the cutting edge 24, it severs the shaving 27. The secondary cutting edge 29 results from the presence in the inner edge 28 of the transverse portion 24 of a channel 32 which is open downwardly and laterally, as shown in Fig. 3, and is defined in part by a step 33 formed in the outer face of a transverse portion 19 along the inner edge 28 thereof. When the front end 22 of a cutter 15L is sharpened, a sloping face 34 is formed which leads from the cutting edge 24 inwardly and rearwardly to meet the inner face (upper face) 35 of the transverse portion 19. As clearly shown in Fig. 4, the face 34 created during the sharpening process extends to the inner edge 28 of the transverse portion 19 and it is intersected by the step or surface 33 in a plane spaced upwardly from the place *c—c* and at a location spaced rearwardly of the rightward end of the main cutting edge 24, thereby forming the secondary cutting edge 29. As the cutter 15L is sharpened by filing or grinding back the front end of the cutter, the secondary cutting edge 29 will be simultaneously sharpened in its proper relation to the main cutting edge 24.

The reason for the faster cutting action of the disclosed chain is that it avoids the condition illustrated in Fig. 8 encountered in the use of saw chains of commonly used form. In section A a cutter 36 is shown lifting one side of a chip or shaving 37 from the bottom of a kerf 38, it being expected that the succeeding cutter 39 of the chain positioned with its cutting edge 40 on the same plane as the cutting edge 41 of the cutter 36 will sever and lift the opposite side 42 of the shaving 37 so that this shaving 37 will be lifted free and clear from the bottom of the kerf as shown in section B of Fig. 8. However, the ideal condition explained in the foregoing is not maintained for the reason that even if the depth gauges associated with the right and lefthand cutters are carefully set for the same depth of cut, chips will get under the gauges so that the cuts are often mismatched. For example, if a cutter, such as shown at 42 in section C of Fig. 8 cuts deeper than the preceding cutter, the shaving 37*b* will not be severed from the bottom of the kerf, but will remain connected thereto by an unsevered portion 43 which must be broken or torn apart in order for the shaving 37*b* to be removed. This absorbs power which, as compared to the action of the present invention, is wasted.

In Figs. 1 and 2, I show depth gauges 44 for the cutters 15, set with relation to the cutters so that a very thin shaving 27 is cut from the bottom of the kerf 18. The cutting of a thin shaving is found to be necessary in high speed chain saws, wherein the cutters, travelling at high speed, remove a chip which has an average thickness of .006 to .008 inch. Therefore, as shown in Fig. 5 the shaving or chip 27 has a thickness which is less than half the thickness of the transverse cutter portion 19. The gauges 44 are shown as being extended from side links 12 which are aligned with the cutter links 10, but this relationship need not be preserved in the practice of the invention for the reason that the gauges may be located on center links or opposite side links of the chain.

In the alternative form of the invention disclosed in Figs. 6 and 7, I show a cutter 50 connected to a link 51, this cutter 50 having a shank 52 and a transverse cutter portion 53, the front end 54 of which is sharpened as indicated at 55 so as to provide a main cutting edge 56 for the cutter 50 which will sever and lift one side of a chip 57. In this form of the invention a secondary cutting edge 58 is formed rearwardly and inwardly of the cutting edge 56, but disposed in sloping relation as shown in Figs. 6 and 7. A diagonal surface 60 is formed on the outer face of the transverse portion 53 of the cutter 50 adjacent the inner edge 61 thereof. This diagonal surface 60, which is outwardly presented and extends along the inner edge 61 of the cutter portion 53 intersects the sloping face 62 which is ground on the front end 54 of the cutter 50 as a part of the sharpening process to produce the cutting edge 56. The line of intersection between the surfaces 60 and 62 defines the secondary cutting edge 58 which slopes rearwardly and inwardly from the end of the main cutting edge 56. The secondary cutting edge 58 cuts the unsevered portion 57' of the shaving 57 as shown in Fig. 6.

I claim:

1. In a high speed saw chain: cutter links and spacer links; pivot means connecting said links in end-to-end relation; and cutters on said cutter links consecutively in allochiral relation, each of said cutters comprising a shank portion extending from a cutter link in spaced relation to the median plane of the chain and a transverse portion having the outer longitudinal edge thereof connected to the extremity of said shank portion and extending toward the median plane of the chain so that the inner longitudinal edge of the transverse portion will be contiguous to said median plane, the front edge of said cutter being sharpened so as to form a main cutting edge extending from a point below the extremity of said shank portion to a point contiguous to said median plane for severing one edge of a shaving and lifting the shaving from the bottom of the kerf being cut, and a stepped secondary cutting edge on said inner edge of said transverse portion rearwardly of said main cutting edge for severing said shaving along a lien which lies close to said median plane.

2. In a high speed saw chain: cutter links and spacer links; pivot means connecting said links in end-to-end relation; and cutters on said cutter links consecutively in allochiral relation, each of said cutters comprising a shank portion extending from a cutter link in spaced relation to the median plane of the chain and a transverse portion having the outer longitudinal edge thereof connected to the extremity of said shank portion and extending toward the median plane of the chain so that the inner longitudinal edge of the transverse portion will be contiguous to said median plane, the front edge of said cutter being sharpened so as to form a relatively long main cutting edge for severing one edge of a shaving and lifting the shaving from the bottom of the kerf being cut, and a relatively short secondary cutting edge on said inner edge of said transverse portion stepped from said main cutting edge in a rearward direction and also toward said chain links for severing said shaving along a line which lies close to said median plane.

3. In a high speed saw chain: cutter links and spacer links; pivot means connecting said links in end-to-end relation; and cutters on said cutter links consecutively in allochiral relation, each of said cutters comprising a shank portion extending from a cutter link in spaced relation to the median plane of the chain and a transverse portion having the outer longitudinal edge thereof connected to the extremity of said shank portion and extending toward the median plane of the chain so that the inner longitudinal edge of the transverse portion will be contiguous to said median plane, the front edge of said cutter being sharpened so as to form a main cutting edge which extends diagonally from a point adjacent the extremity of said shank portion inwardly and rearwardly to said inner edge thereof for severing one edge of a shaving and lifting the shaving from the bottom of the kerf being cut, said transverse portion having a channel along its inner longitudinal edge so that the sharpening of the front edge of said transverse portion will produce an offset secondary cutting edge at the inner end of said main cutting edge for severing said shaving along a line which lies close to said median plane.

4. In a high speed saw chain: cutter links and spacer links; pivot means connecting said links in end-to-end relation; and cutters on said cutter links consecutively in allochiral relation, each of said cutters comprising a shank portion extending from a cutter link in spaced relation to the median plane of the chain and a transverse portion having the outer longitudinal edge thereof connected to the extremity of said shank portion and extending toward the median plane of the chain so that the inner longitudinal edge of the transverse portion will be contiguous to said median plane, the front edge of said cutter being sharpened so as to form a main cutting edge which extends diagonally from a point contiguous to the side of the kerf being cut inwardly and rearwardly to said inner edge thereof for severing one edge of a shaving and lifting the shaving from the bottom of the kerf being cut, and a secondary cutting edge on said inner edge of said transverse portion parallel to said main cutting edge offset therefrom in a direction toward said links of the chain for severing said shaving along a line which lies close to said median plane.

5. In a high speed saw chain: cutter links and spacer links; pivot means connecting said links in end-to-end relation; and cutters on said cutter links consecutively in allochiral relation, each of said cutters comprising a shank portion extending from a cutter link in spaced relation to the median plane of the chain and a transverse portion having the outer longitudinal edge thereof connected to the extremity of said shank portion and extending toward the median plane of the chain so that the inner longitudinal edge of the transverse portion will be contiguous to said median plane, the front edge of said cutter being sharpened so as to form a main cutting edge which extends diagonally from the outer edge of said transverse portion rearwardly to said inner edge thereof for severing one edge of a shaving and lifting the shaving from the bottom of the kerf being cut, said cutting edge having a notch therein near said inner edge of said transverse portion forming a secondary cutting edge for severing said shaving along a line which lies close to said median plane.

6. In a cutter for high speed saw chains: a link; a shank portion extending from an edge of said link; and a transverse cutter portion having its outer longitudinal edge connected to the extremity of said shank portion and being of such width that its inner longitudinal edge will lie contiguous to the median plane of the saw chain in which the cutter is employed, the front edge of said transverse portion being sharpened so as to provide a main cutting edge for lifting one side of a shaving from the bottom of the kerf being cut, and a rearwardly offset secondary cutting edge on said transverse portion adjacent said inner edge thereof for severing said shaving along a longitudinal line contiguous to said inner edge of said transverse portion.

7. In a cutter for high speed saw chains: a link; a shank portion extending from an edge of said link; and a transverse cutter portion having its outer longitudinal edge connected to the extremity of said shank portion and being of such width that its inner longitudinal edge will lie contiguous to the median plane of the saw chain in which the cutter is employed, the front edge of said transverse portion being sharpened so as to provide a main cutting edge for lifting one side of a shaving from the bottom of the kerf being cut, and a secondary cutting edge on said transverse portion adjacent said inner edge thereof, said secondary cutting edge being offset inwardly from the cutting plane defined by the main cutting edge and offset rearwardly from said main cutting edge, for severing said shaving along a longitudinal line contiguous to said inner edge of said transverse portion.

8. In a cutter for high speed saw chains: a link; a shank portion extending from an edge of said link; and a transverse cutter portion having its outer longitudinal edge connected to the extremity of said shank portion and being of such width that its inner longitudinal edge will lie contiguous to the median plane of the saw chain in which the cutter is employed, the front edge of said transverse portion being sharpened so as to provide a main cutting edge for lifting one side of a shaving from the bottom of the kerf being cut, said transverse portion having along its inner edge an outwardly faced longitudinal step so that said transverse cutter portion will have adjacent said inner edge a notch forming a secondary cutting edge for severing said shaving along a longitudinal line contiguous to said inner edge of said transverse portion.

References Cited in the file of this patent

UNITED STATES PATENTS

| 2,744,548 | Stephenson et al. | May 8, 1956 |
| 2,774,396 | Gommel | Dec. 18, 1956 |
| 2,788,811 | Bernard et al. | Apr. 16, 1957 |

FOREIGN PATENTS

| 913,955 | Germany | June 24, 1954 |